US005810651A

United States Patent [19]

De Heer et al.

[11] Patent Number: 5,810,651

[45] Date of Patent: Sep. 22, 1998

[54] APPARATUS FOR PROCESSING AN ENTRAILS PACKAGE REMOVED FROM SLAUGHTERED POULTRY

[75] Inventors: Cornelis De Heer; Frederik Simon Bruijn, both of Oostzaan, Netherlands

[73] Assignee: Machinefabriek Meyn B.V., Oostzaan, Netherlands

[21] Appl. No.: 854,899

[22] Filed: May 13, 1997

[30] Foreign Application Priority Data

May 14, 1996 [NL] Netherlands ............................ 1003102

[51] Int. Cl.[6] ...................................................... A22C 21/00

[52] U.S. Cl. ............................................ 452/106; 452/111

[58] Field of Search .................................... 452/106, 111, 452/112, 113, 114, 116, 138, 177

[56] References Cited

U.S. PATENT DOCUMENTS

| | | | |
|---|---|---|---|
| 3,099,038 | 7/1963 | Platt . | |
| 3,406,425 | 10/1968 | Hill | 452/111 |
| 3,480,991 | 12/1969 | Edwards, Sr. . | |
| 4,073,040 | 2/1978 | Hill . | |
| 4,306,333 | 12/1981 | Delong . | |
| 4,395,795 | 8/1983 | Hazenbroek . | |
| 4,466,158 | 8/1984 | De Long | 452/111 |
| 4,524,489 | 6/1985 | Van Mil . | |
| 4,524,491 | 6/1985 | Hill et al. . | |
| 4,590,643 | 5/1986 | Hill . | |
| 4,608,732 | 9/1986 | Hill et al. | 452/111 |

FOREIGN PATENT DOCUMENTS

| | | |
|---|---|---|
| 0141432 | 5/1985 | European Pat. Off. . |
| 0587253 | 3/1994 | European Pat. Off. . |
| 0679336A1 | 11/1995 | European Pat. Off. . |
| 7305321 | 10/1974 | Netherlands . |
| 7613251 | 5/1978 | Netherlands . |
| 8502785 | 5/1986 | Netherlands . |
| 2120925 | 12/1983 | United Kingdom . |

OTHER PUBLICATIONS

Netherlands Search Report, Jan. 10, 1997.

*Primary Examiner*—Willis Little
*Attorney, Agent, or Firm*—Dority & Manning

[57] ABSTRACT

The invention relates to an apparatus for processing an trails package removed from slaughtered poultry, comprising two parallel and adjacently positioned shafts drivable for an opposite rotation, with a helically extending surface profile, the shafts defining a slot between themselves. At least one of the shafts is provided with at least one ring-shaped circumferential section at which the helically extending surface profile is missing and of which the surface is positioned at least at the level of the crest of the adjacent helically extending surface profile. Both shafts may be provided with a number of such circumferential sections.

7 Claims, 1 Drawing Sheet

APPARATUS FOR PROCESSING AN ENTRAILS PACKAGE REMOVED FROM SLAUGHTERED POULTRY

BACKGROUND OF THE INVENTION

The invention relates to an apparatus for processing an entrails package removed from slaughtered poultry, comprising two parallel and adjacently positioned shafts drivable for an opposite rotation, with a helically extending surface profile, said shafts defining a slot between themselves.

Similar devices are already known in a number of embodiments. Thus, the so-called gizzard peeler is known in which gizzards removed from a slaughtered bird are freed of the surrounding tissue. In such a case, the helically extending surface profile generates the movement of the gizzards and the engagement of the tissue for tearing it loose.

A further device is known in which a complete entrails package is positioned onto the shafts positioned alongside each other and wherein, during a conveyance of the package by the shafts, part of the package is pulled downwards into the slot. Generally, again the gizzard remains on top of the shafts because the gizzard is the most inflexible substance of the entrails package.

OBJECTS AND SUMMARY OF THE INVENTION

It is an object of the invention to improve an apparatus of the type mentioned. Additional objects and advantages of the invention will be set forth in the following description, or may be obvious from the description, or may be learned through practice of the invention.

Thus, the apparatus according to the invention is characterized in that at least one of the shafts is provided with at least one ring-shaped circumferential section at which the helically extending surface profile is missing and of which the surface is positioned at least at the level of the crest of the adjacent helically extending surface profile.

As has been referred to briefly before, the helically extending surface profile, among other things, generates a conveyance of an entrails package positioned on top of the shafts. Moreover, the helically extending surface profile further should provide a processing function. Examples of such a function are the peeling of gizzards mentioned before or the moving downwards part of the entrails package into the slot. With the present invention, a ring-shaped circumferential section is provided, at which the helically extending surface profile is missing, with the result obtained that the entrails package is stopped for a while by said ring-shaped circumferential section. During the stop, the helically extending surface profile may carry out its additional processing function in an improved manner, such that the efficiency of the apparatus can be improved.

Among others, the stop induced by the ring-shaped circumferential section may be ended when a conveyor, which generally is positioned above the shafts, engages the respective entrails package and moves it past said ring-shaped circumferential section. In a known manner, such a conveyor may comprise an endless chain provided with catching fingers. In this aspect, it is to be noted that it can be advantageous to choose the pitch of the helically extending surface profile in such a way that the entrails packages are conveyed faster by the shafts than the velocity of said conveyor; like this it can be guaranteed that, at arrival at the ring-shaped circumferential section, the packages are somewhat ahead of the conveyor and thus may be stopped for a while.

It is not necessary that an additional conveyor is positioned above the shafts; it is possible too that the temporary stopping by means of the circumferential section is ended when a desired processing is completed or when a next entrails package pushes the preceding entrails package past the ring-shaped circumferential section.

In accordance with a preferred embodiment of the apparatus according to the invention, both shafts are provided with such a circumferential section. Generally said circumferential sections of both shafts then are positioned at the same longitudinal position.

Further, it is advantageous when the (each) shaft is provided with a number of such circumferential sections, each separated through an intermediate surface profile. As a result, the advantageous effect caused by a circumferential section may be repeated several times.

For improving the stopping efficiency, it may be advantageous when the surface of each circumferential section projects above the crest of the adjacent helically extending surface profile. Especially when the apparatus is combined with a conveyor for the entrails packages positioned thereabove, it is possible that the surface of each circumferential section projects above the crest of the adjacent helically extending surface profile, without incurring the risk that an entrails package will not pass the respective circumferential section.

A special embodiment of the apparatus according to the invention is characterized in that each shaft is divided into two sections with a different helically extending surface profile, of which the first section has a smaller pitch and the second section has a greater pitch. Using the second section with greater pitch, the operation to be carried out with the shafts can be carried out again with more intensity, that means more aggressively.

Finally, it is advantageous in this aspect when the first and second sections are separated through a said ring-shaped circumferential section.

Hereinafter the invention will be elucidated referring to the drawing, in which an embodiment of the apparatus according to the invention is represented.

DETAILED DESCRIPTION OF THE PREFERRED EMBODIMENTS

Figure 1:
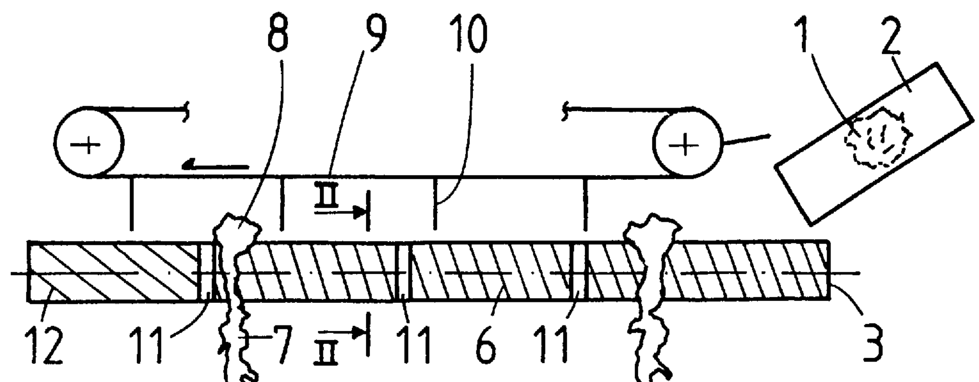
FIG. 1 shows, schematically, an embodiment of the apparatus according to the invention in a side elevational view.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield still a further embodiment. It is intended that the present invention cover such modifications and variations.

Figure 2:
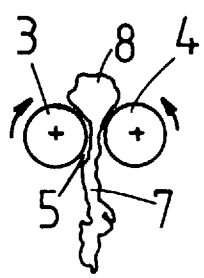
FIG. 2 shows a section according to II—II in FIG. 1.

The apparatus illustrated in the figures is meant for processing entrails packages 1 removed from slaughtered poultry which are supplied, for example, by means of a slide chute 2 indicated only schematically. The apparatus includes (as shows FIG. 2) two parallel and adjacently positioned shafts 3 and 4. For a better representation shaft 4 is not shown in FIG. 1. Between themselves, the shafts 3 and 4 define a slot 5 and the shafts are driven for an opposite rotation, in correspondence with the arrows in FIG. 2, by means of a drive mechanism not shown further. As is known per se, the shafts are journalled at their ends in a manner not shown in detail. At their circumference, the shafts are provided with a helically extending surface profile 6 with a double function. Firstly, the entrails packages 1 positioned on top of the shafts 3 and 4 by means of the slide chute 2 are conveyed from right to left as seen in FIG. 1. Secondly, the surface profile 6 takes care of carrying out an operation, such as, in the embodiment shown, pulling a part 7 of the entrails package downward into the slot 5. The remaining part (for example gizzard 8) remains on top of the shafts 3 and 4.

Further, a conveyor is positioned above the shafts 3 and 4, comprising an endless chain 9 with catching fingers 10.

The shafts are provided with a number of ring-shaped circumferential sections 11, at which the helically extending surface profile 6 is missing.

Figure 3:
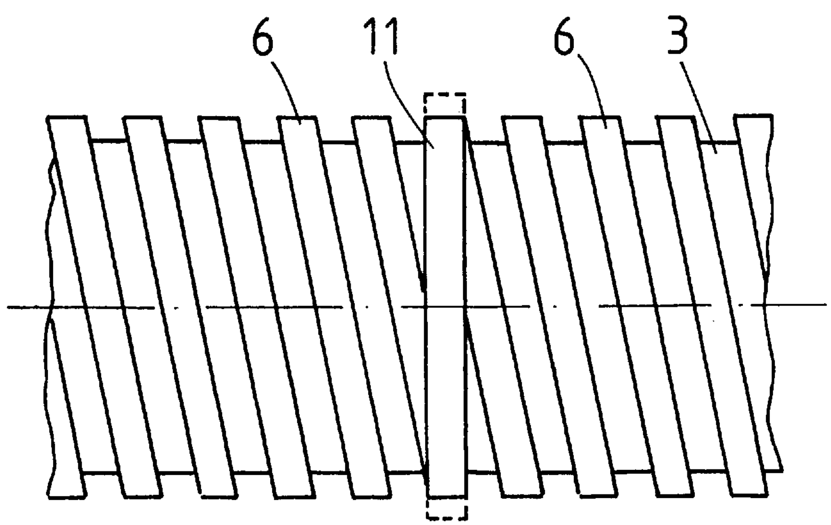
FIG. 3 shows part of the apparatus on a larger scale.

As has been indicated on a larger scale in FIG. 3, the surface of a circumferential section 11 may be positioned at the same level as the crest of the adjacent helically extending surface profile 6 (full line) or may be positioned at a higher level (dotted line).

An entrails package 1 arriving down the slide chute 2 will be positioned on top of the shafts 3 and 4 and will be conveyed to the left. Generally the pitch of the surface profile 6 will be chosen such, that the velocity with which an entrails package 1 moves to the left is larger than the conveying velocity of the chain 9. At the arrival at the most right circumferential section 11 in the figure, the entrails package 1 is stopped thereby until a catching finger 10 of the chain 9 engages the entrails package 1 and moves it past the circumferential section 11. The same occurs at following circumferential sections 11.

During the time that an entrails package 1 is stopped at a circumferential section 11, the processing function of the shafts 3 and 4 may occur in an increased manner. Further, it is for example possible that a gizzard positioned on top of the shafts 3 and 4 is rid of surrounding fat and alike.

Further, it appears from FIG. 1 that the ultimate part of the shafts 3 and 4, following the ultimate circumferential section 11, is provided with a surface profile 12 having a greater pitch. As a result, said ultimate part of the shafts 3 and 4 operates more aggressively, such that the operation to be carried out occurs again in an increased manner.

The invention is not limited to the embodiment described before, which may be varied widely within the scope of the invention as defined by the claims. For example, it is possible that the surface profile differs from which has been shown, or that additional surface profiles are provided shaped as ribs or other projections. Moreover, the conveyor may have a shape differing from the shape 9 or may be dispensed with entirely. Finally it is to be noted, that the apparatus according to the invention is preferably used in an apparatus for splitting up entrails packages removed from the slaughtered poultry. Then, using the apparatus according to the invention, especially the part of the entrails package comprising the guts is pulled down into the slot 5, such that thereafter said part can be supplied to a special processing device for loosening the specific part of the entrails package from the remainder of the package.

We claim:

1. An apparatus for processing an entrails package removed from slaughtered poultry, said apparatus comprising at least two parallel and adjacently disposed rotationally driven shafts, each of said shafts comprising an extending surface profile, said shafts defining a slot therebetween, at least one of said shafts further comprising a ring-shaped surface profile section interrupting said extending surface profile, said ring-shaped surface profile section having a crest height at least equal to that of said extending surface profile, wherein entrails packages are conveyed along said shafts through rotation of said extending surface profiles until said packages reach said ring-shaped surface profile section wherein said packages are paused at least momentarily.

2. The apparatus as in claim 1, wherein said extending surface profiles comprise helically extending profiles.

3. The apparatus as in claim 1, wherein each of said shafts comprise said ring-shaped surface profile sections.

4. The apparatus as in claim 1, wherein each of said shafts comprise a plurality of said ring-shaped surface profile sections.

5. The apparatus as in claim 1, wherein said crest height of said ring-shaped surface profile section extends beyond that of said extending surface profiles.

6. The apparatus as in claim 1, wherein said extending surface profiles comprise helically extending profiles, each of said shafts having at least two sections of said helically extending profiles with different pitches.

7. The apparatus as in claim 6, wherein said sections of helically extending profiles are separated by said ring-shaped surface profile sections.

* * * * *